March 24, 1953 — O. ZUBER — 2,632,584
FEEDER FOR GRANULAR BULK MATERIAL
Filed April 20, 1950
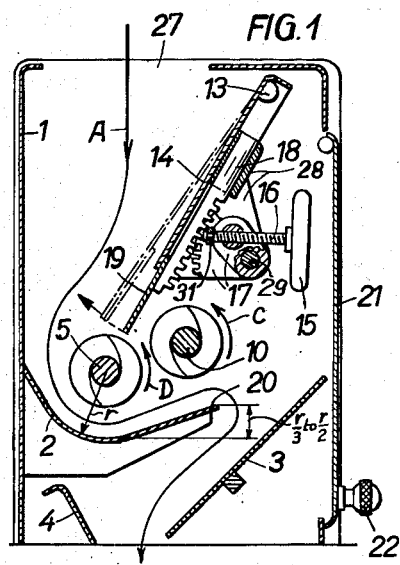
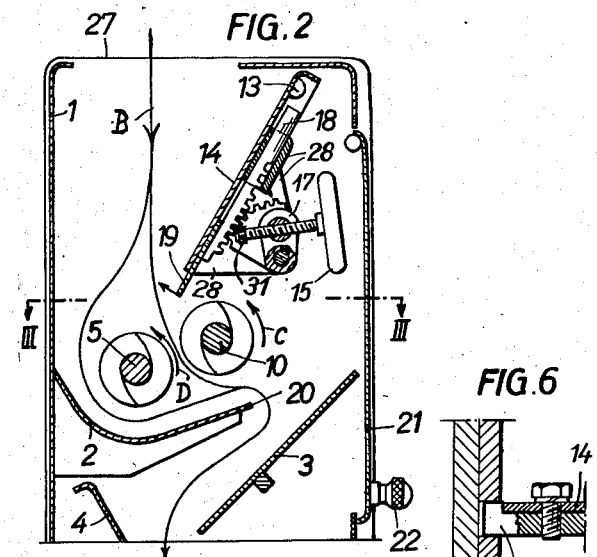
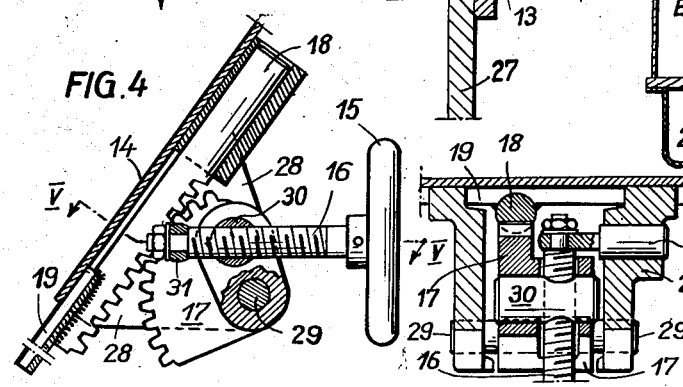
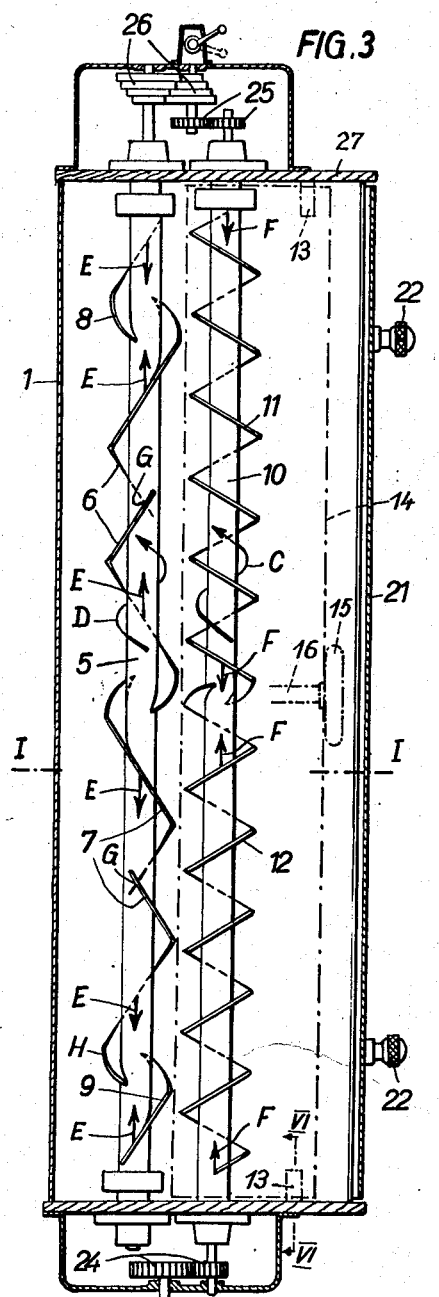
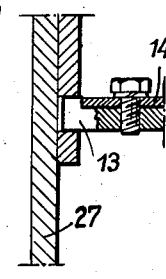
INVENTOR:
Otto Zuber
By
G. P. Goepel
his Attorney Patented Mar. 24, 1953

2,632,584

UNITED STATES PATENT OFFICE 2,632,584

FEEDER FOR GRANULAR BULK MATERIAL

Otto Zuber, Oberuzwil, Switzerland, assignor to Gebruder Buhler, Uzwil, Switzerland Application April 20, 1950, Serial No. 156,960
In Switzerland July 21, 1949

7 Claims. (Cl. 222—238)

Devices of the jigging or reciprocating type commonly are used for feeding granular bulk material of a piece-size up to approximately 1¾ inches, e. g. oil seeds and palm kernels, to crushing mills of which the rollers have a length up to 40 inches. Such jigging feeders are provided with individual drives and are arranged above the roller-mills, but have the great disadvantage that the latter are fed at a discontinuous rate owing to the reciprocating movement of the jigging feeder shoe. Such intermittent feeding unfavorably affects the rollers in particular, and the entire roller-mill is subjected to undesirable vibrations.

Further, it is not possible with the aid of a conventional dispensing slide to obtain a continuous discharge of a feed material comprising both fine and coarse pieces, since when said slide is set for normal output, only small and medium-size pieces of the fed material can pass, while the large pieces are retained in the hopper. When, on the other hand, the said slide is opened to such extent that also the large pieces can pass therethrough, the roller-mill may be readily overloaded.

A jigging feeder, further, requires a relatively expensive crank drive mechanism which involves balancing weights.

It has been tried in prior art to construct a continuously operating feeder on the principle of a sluiceway. In one form of such feeder, a worm trough is disposed in a hopper arranged on top of the roller-mill, the bottom of the trough being open on one of its long sides over the entire length thereof. The material fed to the middle of the hopper is uniformly distributed over the entire length of the trough by means of a distributing worm or screw conveyer, while a feeder shaft disposed in said trough in front of said worm and at a somewhat lower elevation than the latter and provided with radially projecting studs, removes the material at a uniform rate from the trough onto the roller. An adjustable dispensing slide interposed between the two rotary elements, and which may be moved down nearly to the bottom of the worm trough for feeding the rollers with fine granular material, serves for regulating the output of the feeder.

Such known feeder did not satisfy in practice, owing to the fact that pieces of strings and other fibrous impurities contained in the material are wound up on the said studs of the feeder shaft and thus hinder the passage of the material. It also happened that larger pieces of the material were pierced by the feed shaft studs and taken along thereby until they were pushed up against the dispensing slide and the latter was pressed against the dispensing worm, thereby giving rise to undesirable disturbances and defects.

In order to obviate the said disadvantages, the feeder disclosed by my present invention comprises a downwardly opening worm trough inserted in a hopper, a distributing worm and a feeding worm disposed in parallel relation in said trough, the pitch of the distributing worm being greater than that of the feeding worm, the distributing worm conveying the material axially partly from the center outwardly, and the feeding worm conveying the material from the outside to the inside, and a dispensing slide pivoted to the hopper above the said two worms and movable at right angles to the worms.

One form of my present invention is shown by way of example in the accompanying drawing, in which Fig. 1 is a section on the line I—I of Fig. 3, the dispensing slide being positioned for the passage of fine granular material, Fig. 2 is a similar section, but the slide being positioned for coarse granular goods, Fig. 3 is a section on the line III—III of Fig. 2, Fig. 4 shows a portion of Fig. 1 in a larger scale, Fig. 5 a section on line V—V of Fig. 4 and Fig. 6 a section on line VI—VI of Fig. 3.

In the example shown, the numeral 1 designates a hopper in which is inserted a worm trough 2 over the inner longitudinal edge 20 of which the material is discharged downwardly into the roller mill, being guided on its downward flow by the baffles 3 and 4. In the end walls of hopper 1 is journaled a distributing worm 5 of which the helical screw threads 6 and 7 each are interrupted as at G (Fig. 3) and terminate before reaching the ends of the worm 5. The helix of each screw thread arrangement, however, could be interrupted at a plurality of points. As shown in Fig. 3, the helices 6 and 7 from the midpoint of worm 5 are arranged left-hand and right-hand respectively, the end-portions of the worm beyond the ends of the screw threads 6 and 7 being provided with screw threads 8 and 9 respectively, each of which runs on a helix which is of opposite sense to that of the helixes 6 and 7 respectively. The screw threads 8 and 9 have curved radial or rounded portions at their ends nearest the screw threads 6 and 7 respectively.

Within the range of the spillway edge 20 of trough 2 there is provided a feeding worm 10 which is arranged parallel to the distributing worm 5 and is pivoted at a slightly higher level than the latter in the end walls of hopper 1. The screw threads 11 and 12 of worm 10 from the midpoint of the latter run on a left and a right-hand helix respectively, and their pitch is substantially smaller than that of the helical screw threads 6—9 of worm 5.

To the end walls in the head of hopper 1 there is pivoted on pins 13 a dispensing attachment in form of a swing gate 14. A rack 18 is movably guided on gate 14, and a slide 19 fixed to track 18 forms an extension of gate 14. By actuating a toothed segment 17 by means of a handwheel 15 pinned to a threaded spindle 16, the rack 18 and extension gate or slide 19 may be moved relatively to gate 14 for the purpose of regulating or metering the feed from hopper 1 for various particle sizes of the material. The material dispensing and metering attachment 13—19 otherwise is constructed as follows. The threaded spindle 16 is non-rising and is rotatably mounted at its foot end in a pin 31 which is pivoted in a two-part bracket 28. The latter is secured by screws (not shown) to swing gate 14, and the toothed segment 17 is pivoted on a pin 29 to said bracket 28. The spindle 16 passes through and engages a pin 30 pivoted to the toothed segment 17. On rotating handwheel 15 and spindle 16, the toothed segment 17 is rocked upwardly or downwardly on pin 29, and the spindle 16 is rocked with pin 31 in bracket 28. The extension gate or slide 19, by means of rack 18 meshing with segment 17, thus is moved away from or toward the distributer worm 5 so as to regulate the passage from hopper 1 for larger or smaller pieces.

The worm conveyer trough 2 in the example shown in Fig. 1 is so constructed that its longitudinal spill edge 20 is higher than the bottommost point of trough 2 by an amount equal to one third to one half of the distance $r$ between said bottommost point and the centerline of the driven distributor worm 5. The front wall of hopper 1 has a door 21 which may be opened by means of knobs 22 for observing the feeding operation and for adjusting the metering slide 19.

The feeder worm 10 is driven from a pulley 23 and a pair of reducing gears 24 by means of a suitable drive (not shown) of constant speed. The distributor worm 5, as shown in Fig. 3, is driven from feeder worm 10 through a pair of spur gears 25 and a reduction gearing unit 26 which forms no part of my present invention. The feeder worm 10 also could be driven directly from the roller-mill, e. g., by means of a chain drive.

The mode of operation of the feeder described, otherwise is as follows:

The material moves through an opening 27 in hopper 1, in direction of arrow A (Fig. 1) or B (Fig. 2) depending on the position of slide 19, into trough 2 and thus into the range of the two worms 5 and 10. The feeder worm 10 is driven at constant speed by means of gearing 24 in the direction of arrow C in Fig. 3, i. e. counterclockwise. The distributor worm 5 thus is driven at a speed corresponding to the selected setting of reduction gear unit 26, but at half the speed of feeder worm 10 as a maximum, in the direction of arrow D, i. e. counterclockwise. The material arriving in the range of distributor worm 5 of high level is moved simultaneously in radially and axially direction. The material is moved from the center of the trough axially outward towards the ends of the trough, by the various threads 6 and 7, which are so shaped and arranged on the worm shaft 5 that its counterclockwise rotation (as indicated in Figures 1 and 2) causes this axially outward flow of the material within its range. As the material reaches the ends of the trough the end threads 8 and 9 reverse the axially flow of material, by reason of their disposition and shape, which are opposite in sense to the disposition and shape of the associated threads 6 and 7, respectively. The distributed material then moves into the range of the faster rotating feeder worm 10 which moves the material by means of the screw threads 11, 12 in direction of the arrows F (Fig. 3) and toward the discharge opening formed by the space between the spill edge 20 and the baffle 3, whereupon it is conducted to the roller-mill, being guided by the baffles 3 and 4.

Thanks to the use of full-thread screws of which the threads 6, 7, 8 and 9 at the ends are curved radially or rounded off as at H (Fig. 3), strings and other fibrous foreign bodies in the material to be fed are prevented from being wound up. By virtue of the arrangement described of the worms 5 and 10, the form of their threads, and the type of drive, it is possible to uniformly and continuously feed the roller mill with granular material. When a large-size piece of material is engaged by the feeder worm 10, the metering swing gate 14, slide 19 and the entire device shown in Figs. 4 and 5 may rock on the pivots 13 into the position shown in Fig. 1 by dash-and-dot lines, without risk of being bent or damaged. Further, the feed output may be set by means of the step transmission 26 which e. g. may comprise four steps.

I wish it to be understood that I do not desire to be limited to the exact details of construction shown and described, for obvious modifications will occur to a person skilled in the art.

What I claim as new and desire to secure by Letters Patent, is:

1. In a feeder for granular bulk material of different sizes to crushing walls, having a hopper, a distributor worm journaled in the hopper, a feeder worm journaled in the hopper in parallel relation to the distributor worm, and means for driving the two worms, the combination of a worm trough below said worms in the hopper to receive the material having a spillway discharging material downwardly, and of a curvature to hold the material to be engaged by said worms, said distributor worm having its screw threads disposed in opposite sense to each other so that rotation of the worm moves material axially outward from the middle of the hopper to the ends of the distributor worm, and said feed worm having its screw threads disposed in opposite sense to the respective helix on the distributor worm, so that when said feed worm and distributor worm are rotated in the same sense, material is moved axially inwardly from the ends of the feeder toward the middle of the hopper, the pitch of said distributor worm being greater than that of said feeder worm.

2. The structure of claim 1, with pivoted metering means in the hopper above said two worms for the purpose of controlling the flow of material past said worms.

3. The structure of claim 1, with pivoted metering means in the hopper above said two worms to control the flow of material to said worms, and means adjusting said metering means in a direction at right angles to the axes of worms.

4. The structure of claim 1, in which said trough has a curvature substantially concentric with said distributer worm with a radius of curvature having its center coincident with the axis of said distributor worm and having a spill edge higher than the deepest part of said curvature to the extent of one third to one half of said radius of curvature.

5. The structure of claim 1, with the longitudinal axis of said feeder worm disposed within the range of said trough at a level higher than that of the longitudinal axis of said distributor worm.

6. The structure of claim 1, with distributor worm blades interrupted at various points, and having rounded ends, and the end blades of said distributor worm having blades for conveying material in axial directions opposed to the axial conveying directions of the adjacent distributor worm blades, and in the same directions with that of the ends of said feed worm blades.

7. The structure of claim 1, with rounded portions of said feed worm blades at the middle of said feed worm, at the adjacent ends of each series of blades of said feed worm.

OTTO ZUBER.

REFERENCES CITED

The following references are of record in the file of this patent:

UNITED STATES PATENTS

| Number | Name | Date |
|---|---|---|
| 314,652 | Clark | Mar. 31, 1885 |
| 616,546 | Lippitt | Dec. 27, 1898 |
| 810,978 | Richards et al. | Jan. 30, 1906 |
| 1,023,752 | Oswat | Apr. 16, 1912 |
| 1,140,436 | Baumgartner | May 25, 1915 |
| 1,161,369 | Ayers | Nov. 23, 1915 |
| 1,189,021 | Van Houten | June 27, 1916 |
| 1,337,567 | Roth | Apr. 20, 1920 |
| 1,813,519 | Varusky | July 7, 1931 |
| 2,046,603 | Baumgardner | July 7, 1936 |
| 2,071,037 | Kemp | Feb. 16, 1937 |
| 2,135,716 | Johnson | Nov. 8, 1938 |